US010466849B2

(12) United States Patent
Zhang et al.

(10) Patent No.: US 10,466,849 B2
(45) Date of Patent: Nov. 5, 2019

(54) METHOD AND TERMINAL FOR PREVENTING UNINTENTIONAL TRIGGERING OF A TOUCH KEY AND STORAGE MEDIUM

(71) Applicant: GUANGDONG OPPO MOBILE TELECOMMUNICATIONS CORP., LTD., Dongguan, Guangdong (CN)

(72) Inventors: Qiang Zhang, Guangdong (CN); Yixue Ge, Guangdong (CN); Hao Wang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 35 days.

(21) Appl. No.: 15/707,230

(22) Filed: Sep. 18, 2017

(65) Prior Publication Data
US 2018/0173338 A1  Jun. 21, 2018

(30) Foreign Application Priority Data
Dec. 16, 2016 (CN) .......................... 2016 1 1167946

(51) Int. Cl.
*G06F 3/044* (2006.01)
*G06F 1/16* (2006.01)
(Continued)

(52) U.S. Cl.
CPC ............ *G06F 3/044* (2013.01); *G06F 1/1643* (2013.01); *G06F 3/016* (2013.01); *G06F 3/0412* (2013.01);
(Continued)

(58) Field of Classification Search
CPC .... G06F 3/044; G06F 3/04886; G06F 3/0418; G06F 1/1643; G06F 3/0414; G06F 3/0412; G06F 3/016; G06F 3/0416
See application file for complete search history.

(56) References Cited

U.S. PATENT DOCUMENTS 8,643,862 B2    2/2014  Yamazawa
2012/0154293 A1*  6/2012  Hinckley .............. G06F 1/1694
                                                    345/173
(Continued)

FOREIGN PATENT DOCUMENTS

CN       1967449 A      5/2007
CN     101146293 A      3/2008
(Continued)

OTHER PUBLICATIONS

International Search Report (ISR) and Written Opinion (WO) dated Jan. 29, 2018 for International Application No. PCT/JP2017/106824.
(Continued)

*Primary Examiner* — Mark W Regn
(74) *Attorney, Agent, or Firm* — Ladas & Parry LLP

(57) ABSTRACT

A method, a device and a terminal for preventing unintentional triggering of a touch key are disclosed. The method is applicable to a terminal having a touch key and a touch screen including a touch area. The method includes obtaining a current direction state of the touch screen. The method also includes detecting a first touch operation to a touch key when the current direction state of the touch screen is a first direction state. Furthermore, the method includes determining that the first touch operation is an unintentional operation if a second touch operation to the touch area is detected within a preset time period, when the first touch operation is detected.

17 Claims, 6 Drawing Sheets

(51) Int. Cl.
*G06F 3/01* (2006.01)
*G06F 3/041* (2006.01)
*G06F 3/0488* (2013.01)

(52) U.S. Cl.
CPC .......... *G06F 3/0414* (2013.01); *G06F 3/0416* (2013.01); *G06F 3/0418* (2013.01); *G06F 3/04886* (2013.01)

(56) References Cited

U.S. PATENT DOCUMENTS

| | | | |
|---|---|---|---|
| 2014/0240257 A1* | 8/2014 | Yu | G06F 3/0488 345/173 |
| 2016/0062586 A1* | 3/2016 | Muller | G06F 3/04842 715/769 |
| 2016/0092022 A1 | 3/2016 | Lee et al. | |

FOREIGN PATENT DOCUMENTS

| | | |
|---|---|---|
| CN | 102999266 A | 3/2013 |
| CN | 103324325 A | 9/2013 |
| CN | 103699318 A | 4/2014 |
| CN | 105117151 A | 12/2015 |
| CN | 105631367 A | 6/2016 |
| CN | 105791561 A | 7/2016 |
| CN | 105867789 A | 8/2016 |
| CN | 106201292 A | 12/2016 |
| CN | 106648232 A | 5/2017 |
| CN | 106855784 A | 6/2017 |
| KR | 10-2014-0105354 A | 9/2014 |

OTHER PUBLICATIONS

KR 10 2014 0105354 A_English Abstract.
CN 105791561 A_English Abstract.
CN 105867789 A_English Abstract.
CN 1967449 A_English Abstract.

* cited by examiner ent of the disclosure.
METHOD AND TERMINAL FOR PREVENTING UNINTENTIONAL TRIGGERING OF A TOUCH KEY AND STORAGE MEDIUM

CROSS REFERENCE TO RELATED APPLICATION

This application claims the priority benefit of Chinese Patent Application No. 201611167946.2, filed on Dec. 16, 2016, the contents of which are incorporated by reference herein in their entirety for all purposes.

TECHNICAL FIELD

The present disclosure relates to the technology of touch screen, and particularly to a method and a terminal for preventing unintentional triggering of a touch key, as well as a storage medium.

BACKGROUND

At present, smart phones are usually equipped with a touch screen and touch keys. The touch screen is used to display the user interaction interface, as well as to receive user input operations, such as click, slide, etc. Touch keys are usually located adjacent to the touch screen, acting as HOME key, return key, menu keys and realizing other commonly used functions. When playing games on the smart phone, the user's finger may occasionally slide on the sensing area of the touch key when performing sliding operation on the touch screen, thus triggering the function of the touch key. This may lead to unintentional trigger issues, such as return to the desktop, interruption of the current application, etc.

SUMMARY

The embodiments of the present disclosure provide a method and a terminal for preventing unintentional triggering of a touch key as well as a storage medium, which can reduce the occurrence of unintentional triggering of the touch key.

According to an aspect of the present disclosure, a method for preventing unintentional triggering of a touch key is provided. The method is applicable to a terminal having a touch key and a touch screen including a touch area. The method includes obtaining a current direction state of the touch screen. The method also includes detecting a first touch operation to the touch key when the current direction state of the touch screen is a first direction state. Furthermore, the method includes determining that the first touch operation is an unintentional operation if a second touch operation to the touch area is detected within a preset time period, when the first touch operation is detected.

According to another aspect of the present disclosure, a terminal is provided. The terminal includes a case, a processor, a memory, a circuit board, a touch screen and a power supply circuit. The touch screen is configured to convert a user operation into an electrical signal and input the electrical signal to the processor, and display a visual output signal. The circuit board is disposed inside a space enclosed by the case. The processor and the memory are arranged on the circuit board. The power supply circuit is configured to supply power to each circuit or device of the terminal. The memory is configured to store executable program codes. The processor is configured to run a program corresponding to the executable program codes by reading the executable program codes stored in the memory so as to execute processes. The processes include obtaining a current direction state of the touch screen. The processes also include detecting a first touch operation to the touch key when the current direction state of the touch screen is a first direction state. The processes further include determining that the first touch operation is an unintentional operation if a second touch operation to the touch area is detected within a preset time period, when the first touch operation is detected.

According to yet another aspect of the present disclosure, a non-transitory computer-readable storage medium is provided. The storage medium stores executable program codes which, when executed by one or more computer processors, cause the one or more computer processors to run a program corresponding to the executable program codes by reading the executable program codes stored in the memory, so as to execute a method for preventing unintentional triggering of a touch key. The method includes obtaining a current direction state of the touch screen. The method also includes detecting a first touch operation to the touch key when the current direction state of the touch screen is a first direction state. Furthermore, the method includes determining that the first touch operation is an unintentional operation if a second touch operation to the touch area is detected within a preset time period, when the first touch operation is detected.

Other features of the technology will be apparent from consideration of the information contained in the following detailed description.

DETAILED DESCRIPTION OF THE EMBODIMENTS

Figure 1:
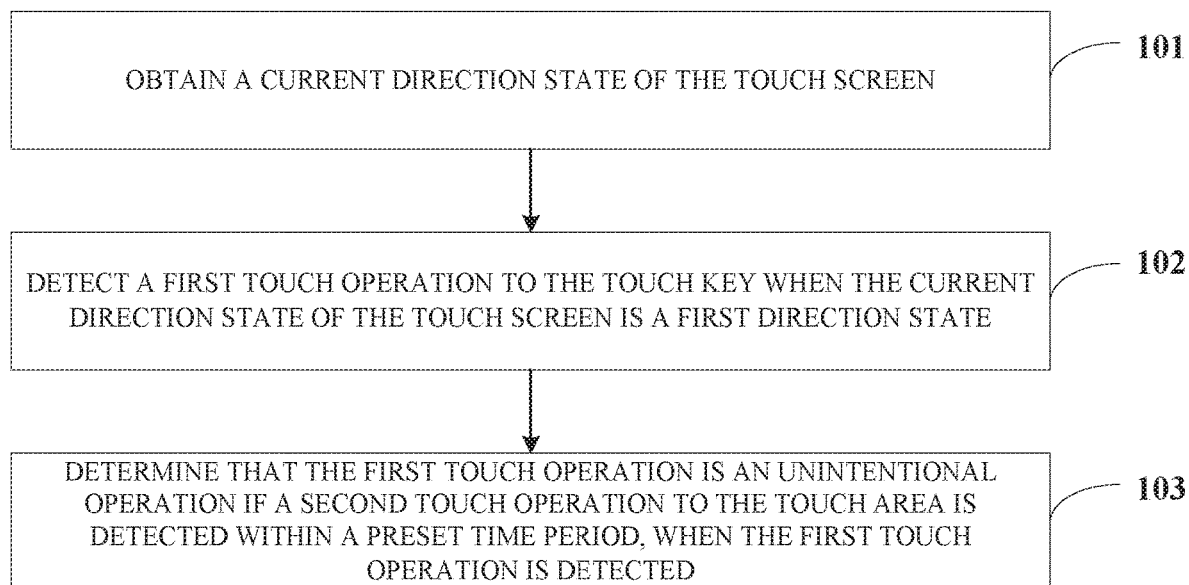
FIG. 1 is a flowchart of a method for preventing unintentional triggering of a touch key according to an embodiment of the disclosure.

The disclosure will now be described in further detail with reference to the accompanying drawings and examples. It is to be understood that the specific embodiments described herein are for the purpose of explaining the disclosure and are not intended to be limiting of the disclosure. It is to be noted that, for the sake of convenience of description, only part of the disclosure is shown in the drawings rather than the entire contents.

Before discussing the exemplary embodiments in more detail, it should be noted that some exemplary embodiments are described as processes or methods depicted in the flowcharts. Although the flowcharts describe the steps as sequential processing, many of these steps may be implemented concurrently, concurrently or concurrently. In addition, the order of the steps may be rearranged. The process may be terminated when its operation is complete, but may also have additional steps not included in the drawings. The processing may correspond to methods, functions, procedures, subroutines, subroutines, and the like.

FIG. 1 is a flowchart of a method for preventing unintentional triggering of a touch key according to an embodiment of the disclosure. The method according to this embodiment is applicable to a terminal with a touch key and a touch screen. The touch screen includes a touch area adapted to prevent unintentional triggering of the touch key. The method can be executed by a device for preventing unintentional triggering of the touch key. The device can be realized by software or hardware or the combination thereof, and usually can be integrated to a terminal. As illustrated in FIG. 1, the method includes the operations as follows. The method may start at block 101.

At block 101, a current direction state of the touch screen is obtained.

In an embodiment, the terminal may specifically be a device such as smart phone and a tablet computer, which integrates a touch screen, preferably a terminal with a narrow bezel or a borderless design. The direction state of the touch screen includes a first direction state and a second direction state, which can be detected by a gravity sensor or other type of sensor, or can be determined by identifying the position of the device being held by the user's hand. The direction state of the touch screen is the first direction state, when the user's hand gesture on the touch screen makes it easy for the finger to enter the sensing area of the touch key.

In this embodiment, the first direction state is the horizontal screen state, and the second direction state is the vertical screen state. In other embodiments, the first direction state may be the vertical screen state, and accordingly, the second direction state is the horizontal screen state.

At block 102, a first touch operation to the touch key is detected when the current direction state of the touch screen is a first direction state.

Figure 2:
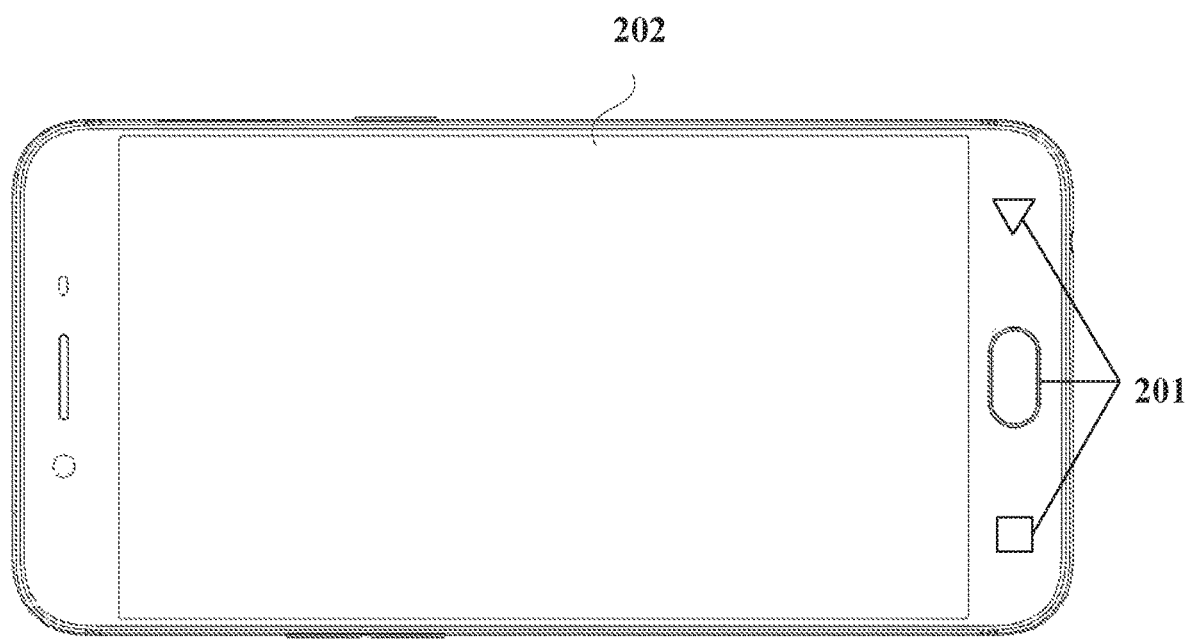
FIG. 2 is a schematic diagram of a terminal for preventing unintentional triggering of a touch key according to an embodiment of the disclosure.

In an embodiment, the touch operations to the touch key can include various forms such as clicking, sliding or long pressing, etc. Illustratively, FIG. 2 is a schematic diagram of a terminal of a method for preventing unintentional triggering of a touch key according to an embodiment of the disclosure. As illustrated in FIG. 2, the terminal includes a touch key 201 and a touch area 202. The touch area 202 refers to an area on the touch screen for displaying an image. The touch key 201 may include at least one of a HOME key, a return key, a search key, and a menu key. The touch key 201 may be a capacitive responsive key that is independent of the touch screen, or may be a capacitive responsive key using a touch screen sensing circuit. It is detected whether there is a first touch operation to the touch key when the current direction state of the touch screen is a first direction state.

At block 103, it is determined that the first touch operation is an unintentional operation if a second touch operation to the touch area is detected within a preset time period, when the first touch operation is detected.

In an embodiment, the first touch operation may be a touch operation to the touch key, and the second touch operation may be a touch operation to the touch area. The touch operation to the touch area may include clicking or sliding, etc. The touch screen of the existing terminals includes resistive touch screen, capacitive touch screen and piezoelectric touch screen, etc. When touched by the user, the touch screen will detect touch information, and then identify the user's touch operation. The capacitive touch screen, for example, can sense the change of capacitance. When the user touches the touch screen, the touch screen senses the change of the capacitance, recognizes the touch information including the x coordinate, the y coordinate, the size of the contact surface (length and width, etc.) and the number of fingers, etc. After the touch information is recognized, the coordinate information is reported to the upper layer through the input system, and the touch operation to the touch screen can be detected by using the touch information. When a touch operation to the touch key is detected, if a touch operation to the touch area is detected within a preset time period, for example, 200 milliseconds, it can be determined that the touch operation to the touch key is an unintentional operation. Illustratively, as shown in FIG. 2, a second touch operation to the touch area 202 is detected within a preset time period, and the first touch operation will not be reported to prevent unintentional triggering.

By the method for preventing unintentional triggering of the touch key as provided by embodiments of the present disclosure, a current direction state of the touch screen is obtained; a first touch operation to the touch key is detected when the current direction state of the touch screen is a first direction state; and, it is determined that the first touch operation is an unintentional operation if a second touch operation to the touch area is detected within a preset time period, when the first touch operation is detected. The embodiments of the present disclosure solves the problem that an application may be mistakenly shut down due to direct report of unintentional operation of the touch key, and thereby the processing accuracy of key touch operations of the terminal can be improved, with less occurrence of unintentional triggering of the touch key, achieving the effect of user experience improvement.

Based on the above technical scheme, the method further includes, after detecting a first touch operation to the touch key, reporting the first touch operation if the second touch operation to the touch area is not detected within the preset time period, when the first touch operation is detected.

In an embodiment, the preset time period can be obtained according to the response speed of the system or the statistical optimum time length for preventing unintentional touch. When the first touch operation to the touch key is detected, if no second touch operation to the touch area is detected within the preset time period, for example, 200 milliseconds, the first touch operation to the touch key will be reported. In this way, it is possible to effectively prevent problems such as interruption of application processing caused by unintentional operations of the user in the horizontal screen state. For example, it is possible to prevent the user from exiting a game due to unintentional operations.

Figure 3:
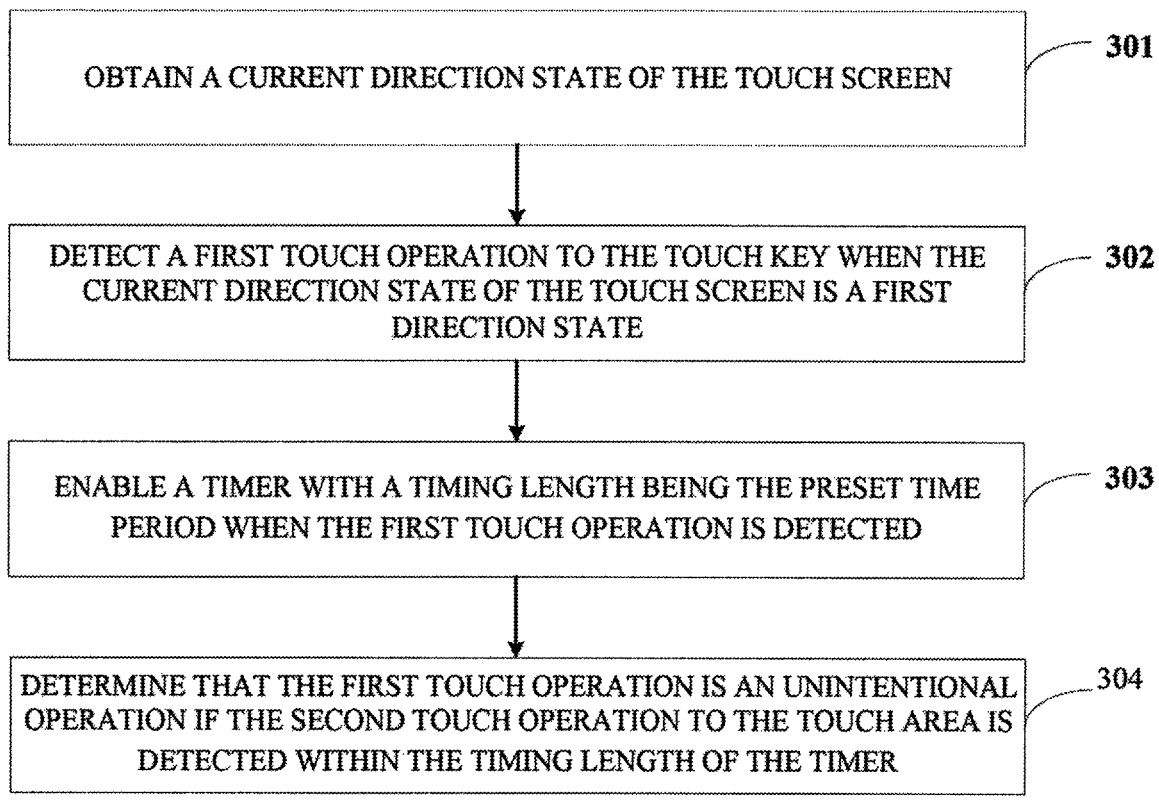
FIG. 3 is a flowchart of a further method for preventing unintentional triggering of a touch key according to an embodiment of the disclosure.

FIG. 3 is a flowchart of a further method for preventing unintentional triggering of a touch key according to an embodiment of the disclosure. The present embodiment is a modification on the basis of the above-described embodiment. In this embodiment, the "determining that the first touch operation is an unintentional operation if a second touch operation to the touch area is detected within a preset time period, when the first touch operation is detected" is modified to "enabling a timer with a timing length being the preset time period when the first touch operation is detected; determining that the first touch operation is an unintentional operation if a second touch operation to the touch area is detected within a preset time period, when the first touch operation is detected".

Accordingly, the method of the embodiment includes the operations as follows. The method may start at block 301.

At block 301, a current direction state of the touch screen is obtained.

At block 302, a first touch operation to the touch key is detected when the current direction state of the touch screen is a first direction state.

At block 303, a tinier with a timing length being the preset time period is enabled when the first touch operation is detected.

In this embodiment, the timer is used to assist in determining whether the preset time period has lapsed. For example, if the preset time period is 200 milliseconds, the timer will be set with a timing length of 200 milliseconds.

At block 304, it is determined that the first touch operation is an unintentional operation if the second touch operation to the touch area is detected within the timing length of the timer.

In an embodiment, the operations executed within the timing length of the timer are the same to the operation at the above block 103 and will not be repeated.

In the method for preventing unintentional triggering of the touch key as provided by the embodiments of the present disclosure, it is determined that whether a second touch operation to the touch area is detected within a preset time period using a timer as an assistant. On this basis, it can be determined that whether a first touch operation to the touch key is an unintentional operation. Thus, it is possible to solve the problem that an application may be mistakenly shut down due to direct report of unintentional operation of the touch key, and thereby the processing accuracy of key touch operations of the terminal can be improved, achieving the effect of user experience improvement.

Figure 4:
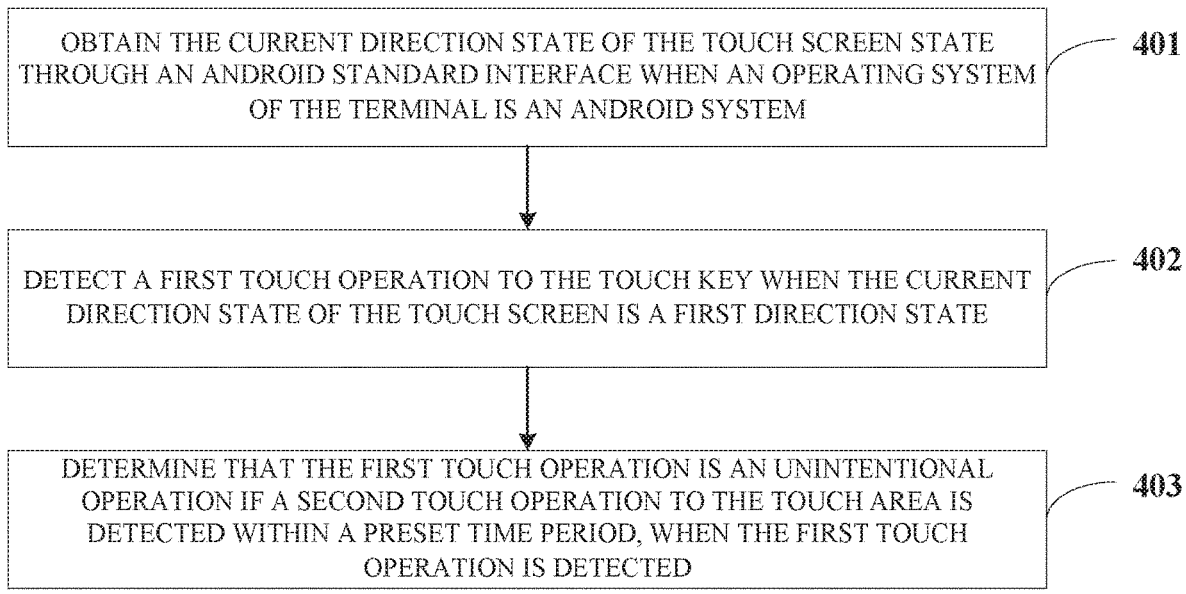
FIG. 4 is a flowchart of a further method for preventing unintentional triggering of a touch key according to an embodiment of the disclosure.

FIG. 4 is a flowchart of a further method for preventing unintentional triggering of a touch key according to an embodiment of the disclosure. The present embodiment is a modification on the basis of the above-described embodiments. In this embodiment, the "obtaining a current direction state of the touch screen" is modified to "obtaining the current direction state of the touch screen state through an Android standard interface when an operating system of the terminal is an Android system".

Accordingly, the method of the embodiment includes the operations as follows. The method may start at block 401.

At block 401, the current direction state of the touch screen state is obtained through an Android standard interface when an operating system of the terminal is an Android system.

In an embodiment, the current direction state of the touch screen state can be obtained through an Android standard interface when an operating system of the terminal is an Android system. The Android standard interface may be, for example, getConfiguration( ).

At block 402, a first touch operation to the touch key is detected when the current direction state of the touch screen is a first direction state.

At block 403, it is determined that the first touch operation is an unintentional operation if a second touch operation to the touch area is detected within a preset time period, when the first touch operation is detected.

In the method for preventing unintentional triggering of the touch key as provided by the embodiments of the present disclosure, it is easy to determine whether the current direction state of the touch screen is the first direction state by using an Android standard interface to obtain the current direction state of the touch screen. At this time, it is determined that the first touch operation is an unintentional operation if a second touch operation to the touch area is detected within a preset time period, when the first touch operation is detected. The embodiments of the present disclosure solves the problem that an application may be mistakenly shut down due to direct report of unintentional operation of the touch key, and thereby the processing accuracy of key touch operations of the terminal can be improved, achieving the effect of user experience improvement.

Figure 5:
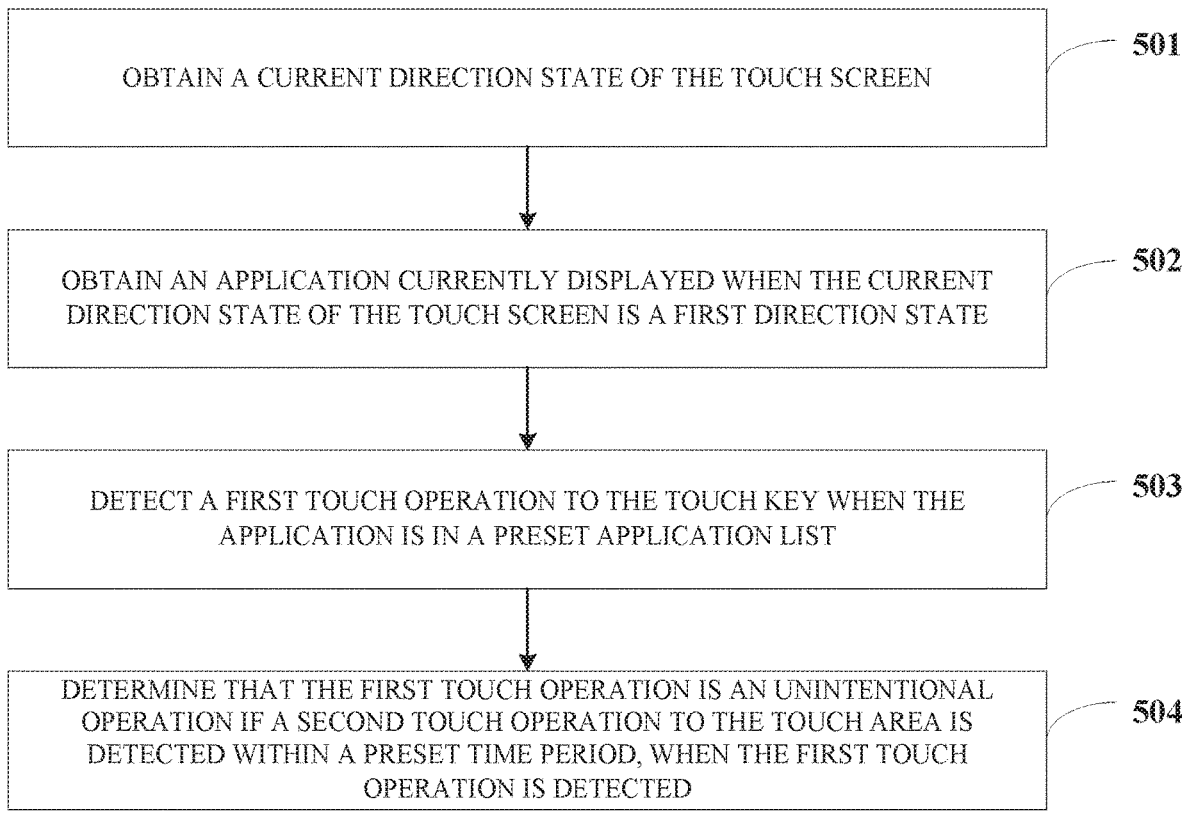
FIG. 5 is a flowchart of a further method for preventing unintentional triggering of a touch key according to an embodiment of the disclosure.

FIG. 5 is a flowchart of a further method for preventing unintentional triggering of a touch key according to an embodiment of the disclosure. The present embodiment is a modification on the basis of the above-described embodiments. In this embodiment, the operation of "detecting a first touch operation to the touch key when the current direction state of the touch screen is a first direction state" is modified to "obtaining an application currently displayed, when the current direction state of the touch screen is a first direction state; and detecting a first touch operation to the touch key when the application is in a preset application list."

Accordingly, the method of the embodiment includes operations as the follows. The method may start at block 501.

At block 501, a current direction state of the touch screen is obtained.

At block 502, an application currently displayed is obtained, when the current direction state of the touch screen is a first direction state.

Obtaining the currently displayed application mainly includes obtaining the name of the application currently displayed, or obtaining information about the application currently displayed to analyze the same for the application name.

At block 503, a first touch operation to the touch key is detected when the application is in a preset application list.

In an embodiment, the preset application list may be a system default application list, or an application list added later by the user according to his own needs. For example, the preset application list can include those applications that operate with the current direction state of the touch screen being a first direction state, and the touch area or the touch key being touched by the user during the operation. By comparing the name of the application currently displayed with application names in the preset application list, it is determined that whether the application currently displayed is an application in the application list. When the application currently displayed belongs to the applications in the application list, the first touch operation to the touch key is detected and the touch key is prevented from unintentional triggering by the delay detection mechanism. If the application currently displayed does not belong to the applications in the application list, there is no need to perform preventing of unintentional triggering of the touch key by the delay detection mechanism. For example, the preset application list includes Game Application A. When the application currently displayed is Game Application A, the first touch operation to the touch key is detected and the touch key is prevented from unintentional triggering by the delay detection mechanism.

At block 504 it is determined that the first touch operation is an unintentional operation if a second touch operation to the touch area is detected within a preset time period, when the first touch operation is detected.

In the method for preventing unintentional triggering of the touch key as provided by the embodiments of the present disclosure, it is determined whether the application currently displayed is an application in the preset application list when the current direction state of the touch screen is determined as a first direction state. This can achieve targeted processing of the application, improve the processing efficiency, and solve the problem that an application may be mistakenly shut down due to direct report of unintentional operation of the touch key. Thereby, the processing accuracy of key touch operations of the terminal can be improved, achieving the effect of user experience improvement.

Figure 6:
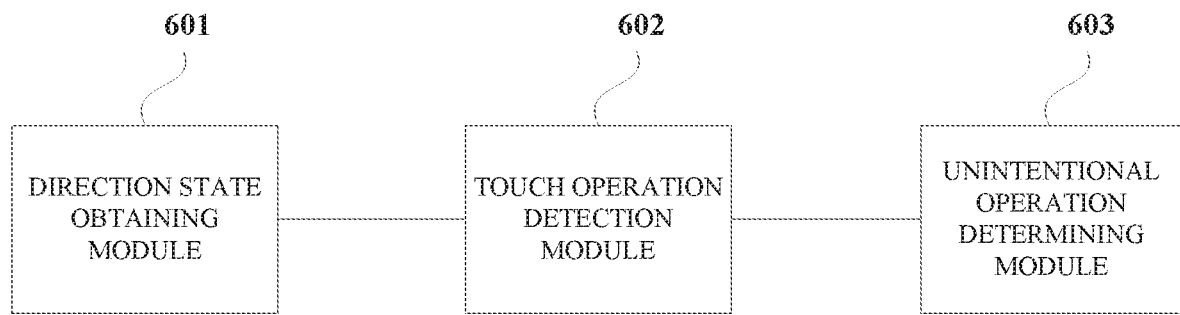
FIG. 6 is a structural block diagram of a device for preventing unintentional triggering of a touch key according to an embodiment of the disclosure.

FIG. 6 is a structural block diagram of a device for preventing unintentional triggering of a touch key according to an embodiment of the disclosure. The device can be realized by software or hardware or the combination thereof, and can be integrated to a terminal having a touch key and a touch screen including a touch area. It is possible to control the touch screen of the terminal by executing a method for preventing unintentional triggering of the touch key.

As illustrated in FIG. 6, the device includes a direction state obtaining module 601, a touch operation detection module 602 and an unintentional operation determining module 603. The direction state obtaining module 601 is configured to obtain a current direction state of the touch screen. The touch operation detection module 602 is configured to detect a first touch operation to the touch key when the current direction state of the touch screen is a first direction state. The unintentional operation determining module 603 is configured to determine that the first touch operation is an unintentional operation if a second touch operation to the touch area is detected within a preset time period, when the first touch operation is detected.

The device for presenting unintentional triggering of the touch key as provided by the embodiments of the present disclosure solves the problem that an application may be mistakenly shut down due to direct report of unintentional operation of the touch key, and thereby the processing accuracy of key touch operations of the terminal can be improved, achieving the effect of user experience improvement.

On the basis of the above embodiments, the unintentional operation determining module 603 is configured to enable a timer with a timing length being the preset time period when the first touch operation is detected, and determine that the first touch operation is an unintentional operation if the second touch operation to the touch area is detected within the timing length of the timer.

On the basis of the above embodiments, the device further includes a touch operation reporting module, configured to report the first touch operation if the second touch operation to the touch area is not detected within the preset time period when the first touch operation is detected, after detecting the first touch operation to the touch key.

On the basis of the above embodiments, the unintentional operation determining module 601 is configured to obtain the current direction state of the touch screen state through an Android standard interface when an operating system of the terminal is an Android system.

On the basis of the above embodiments, the unintentional operation determining module 602 is configured to obtain an application currently displayed, when the current direction state of the touch screen is a first direction state, and detect a first touch operation to the touch key when the application is in a preset application list.

Embodiments of the disclosure further provide a terminal, including a case, a processor, a memory, a circuit board and a power supply circuit. The circuit board is disposed inside a space enclosed by the case. The processor and the memory are arranged on the circuit board. The power supply circuit is configured to supply power to each circuit or device of the terminal. The memory is configured to store executable program codes. The processor is configured to run a program corresponding to the executable program codes by reading the executable program codes stored in the memory to execute obtaining a current direction state of the touch screen, detecting a first touch operation to the touch key when the current direction state of the touch screen is a first direction state, and determining that the first touch operation is an unintentional operation if a second touch operation to the touch area is detected within a preset time period, when the first touch operation is detected.

Figure 7:
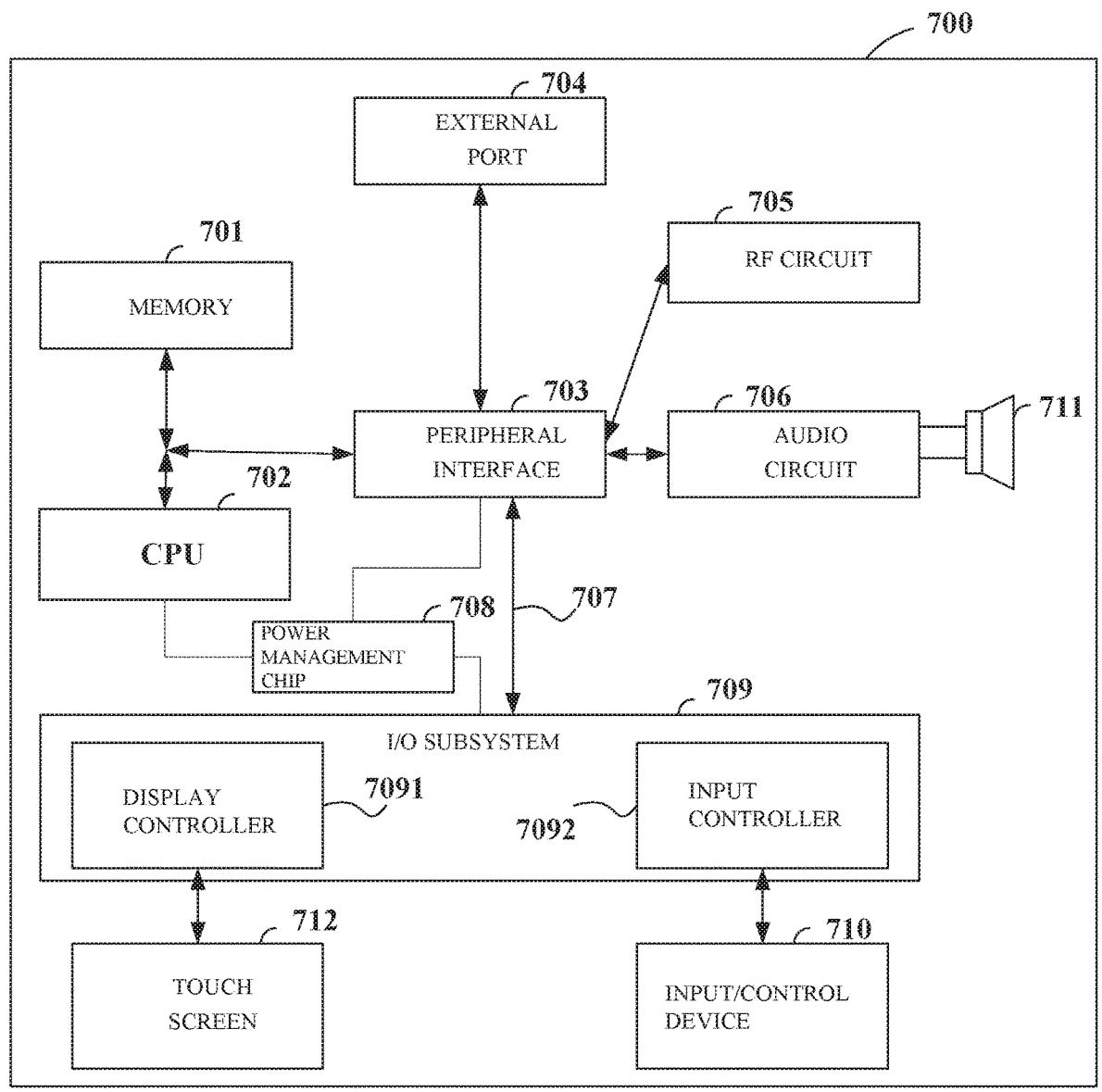
FIG. 7 is a structural schematic diagram of a terminal according to an embodiment of the disclosure.

The terminal can include the devices for preventing unintentional triggering of the touch key provided by any embodiments of the disclosure. FIG. 7 is a structural schematic diagram of a terminal according to an embodiment of the disclosure. As illustrated in FIG. 7, the terminal may include a memory 701, a Central Processing Unit (hereinafter referred to as CPU) 702, a peripheral interface 703, an RF (radio frequency) circuit 705, an audio circuit 706, a speaker 711, a power management chip 708, an input/output (I/O) subsystem 709, a touch screen 712, other input/control device 710, and an external port 704. These components communicate via one or more communication buses or signal lines 707. The power management chip 708 is a core chip in the power supply circuit.

It should be understood that the illustrated terminal 700 is only one example of a terminal and the terminal 700 may have more or fewer components than shown; two or more components may be combined, or there may be different configurations. The various components shown in the figures may be implemented in hardware, software, or a combination of hardware and software, including one or more signal processing and/or application specific integrated circuits.

The terminal for preventing unintentional triggering of the touch key provided by the embodiment will be described in detail, and the terminal is exemplified by a mobile phone.

The memory 701 may be accessed by CPU 702, peripheral interface 703, etc., which may include high-speed random access memory and nonvolatile memory, such as one or more disk storage devices, flash memory devices, or other volatile solid state memory devices.

The peripheral interface 703 may connect the input and output peripherals of the device to the CPU 702 and the memory 701.

The I/O subsystem 709 may connect the input and output peripherals of the device, such as the touch screen 702 and other input/control device 710, to the peripheral interface 703. The I/O subsystem 709 may include a display controller 7091 and one or more input controllers 7092 for controlling other input/control device 710. One or more input controllers 7092 may send or receive electrical signals to or from the other input/control device 710. The other input/control devices 710 may include physical buttons (push buttons, rocker buttons, etc.), dial pad, slide switch, joystick, click wheel. It is to be noted that the input controller 7092 may be connected to any of the group including: a keyboard, an infrared port, a USB interface, and a pointing device such as a mouse.

The touch screen 712 is an input and output interface between the terminal and the user, which can display the visual output to the user. The visual output may include graphics, text, icons, video, etc.

The display controller 7091 in the I/O subsystem 709 may send or receive an electrical signal to or from the touch screen 712. The touch screen 712 may detect the touch on the touch screen, and the display controller 7091 may convert the detected contact into interaction with the user interface object displayed on the touch screen 712, such that the human-computer interaction is realized. The user interface object displayed on the touch screen 712 may be icons of the running games, networking icons to the corresponding network, etc. It is noted that the device may also include a light mouse, which is a touch-sensitive surface that does not exhibit a visual output, or an extension of a touch-sensitive surface formed by a touch screen.

The RF circuit 705 is mainly used for establishing the communication between the mobile phone and the wireless network (i.e., the network side), and realizes the data receiving and sending of the mobile phone and the wireless network, such as sending and receiving short messages, e-mail, etc. Specifically, the RF circuit 705 receives and transmits an RF signal, which is also referred to as an electromagnetic signal. Specifically, the RF circuit 705 converts the electrical signal into an electromagnetic signal or converts the electromagnetic signal into an electrical signal, and communicate with the network and other devices with the electromagnetic signal. The RF circuit 705 may include known circuitry for performing these functions, including, but not limited to, an antenna system, an RF transceiver, one or more amplifiers, tuners, one or more oscillators, a digital signal processor, a CODEC (COder-DECoder) chipset, and Subscriber Identity Module (SIM), etc.

The audio circuit 706 is mainly used for receiving audio data from the peripheral interface 703, converting the audio data into an electrical signal, and transmitting the electrical signal to a speaker 711.

The speaker 711 is used for restore the voice signal received by the handset from the fireless network through the RF circuit 705 to sound and playing the sound to the user.

A power management chip 708 is sued for powering to and managing the power of the CPU 702, the I/O subsystem and hardware connected to the peripheral interface.

The CPU 702 provided by the embodiments of the present disclosure can perform the method provided by any of the embodiments of the present disclosure, and has the functional modules corresponding to the methods executed and the beneficial effects.

It should be noted that for a person skilled in the art, partial or full processes to realize the methods in the above embodiments can be accomplished by related hardware instructed by a computer program. The storage medium stores executable program codes which, when executed by one or more computer processors, cause the one or more computer processors to perform a method for preventing unintentional triggering of a touch key as described in the above embodiments. The storage medium can be a disk, a light disk, a Read-Only Memory or a Random Access Memory, etc.

Note that the above are only preferred embodiments of the present disclosure and the technical principles used. It will be understood by those skilled in the art that the present disclosure is not limited to the specific embodiments described herein, and that various changes, modifications and substitutions will occur to those skilled in the art without departing from the scope of the present disclosure. Thus, while the present disclosure has been described in more detail by way of the above examples, the present disclosure is not limited to the above embodiments, but may include more and more equivalent embodiments without departing from the spirit of the disclosure. The scope of the disclosure is to be determined by the scope of the appended claims.

What is claimed is that:

1. A method for preventing unintentional triggering of a touch key applicable to a terminal having a touch key and a touch screen including a touch area, comprising:
    obtaining a current direction state of the touch screen;
    obtaining an application currently displayed when the current direction state of the touch screen is a first direction state;
    determining whether the application currently displayed is an application in a preset application list by comparing a name of the application currently displayed with the application names in the preset application list;
    detecting a first touch operation to the touch key when the application currently displayed is in the preset application list; and
    determining that the first touch operation is an unintentional operation if a second touch operation to the touch area is detected within a preset time period when the first touch operation is detected.

2. The method of claim 1, wherein determining that the first touch operation is the unintentional operation if the second touch operation to the touch area is detected within the preset time period when the first touch operation is detected comprises:
    enabling a timer with a timing length being the preset time period when the first touch operation is detected; and
    determining that the first touch operation is the unintentional operation if the second touch operation to the touch area is detected within the timing length of the timer.

3. The method of claim 1, further comprising, after detecting the first touch operation to the touch key:
    reporting the first touch operation if the second touch operation to the touch area is not detected within the preset time period, when the first touch operation is detected.

4. The method of claim 1, wherein obtaining the current direction state of the touch screen comprises:
    obtaining the current direction state of the touch screen state through an Android standard interface when an operating system of the terminal is an Android system.

5. The method of claim 1, wherein the preset application list comprises system default applications.

6. The method of claim 1, wherein the preset application list comprises applications that run with the current direction state of the touch screen being the first direction state, and with touch operations to the touch area or the touch key.

7. A terminal, comprising a case, a processor, a memory, a circuit board and a power supply circuit;
    the circuit board is disposed inside a space enclosed by the case;
    the processor and the memory are arranged on the circuit board;
    the power supply circuit is configured to supply power to each circuit or device of the terminal;
    the memory is configured to store executable program codes;
    the processor is configured to run a program corresponding to the executable program codes by reading the executable program codes stored in the memory to execute:
    obtaining a current direction state of the touch screen;
    obtaining an application currently displayed when the current direction state of the touch screen is a first direction state;
    determining whether the application currently displayed is an application in a preset application list by comparing a name of the application currently displayed with the application names in the preset application list;

detecting a first touch operation to the touch key when the application currently displayed is in the preset application list; and determining that the first touch operation is an unintentional operation if a second touch operation to the touch area is detected within a preset time period, when the first touch operation is detected.

8. The terminal of claim 7, wherein determining that the first touch operation is the unintentional operation if the second touch operation to the touch area is detected within the preset time period when the first touch operation is detected comprises:

enabling a timer with a timing length being the preset time period when the first touch operation is detected; and determining that the first touch operation is the unintentional operation if the second touch operation to the touch area is detected within the timing length of the timer.

9. The terminal of claim 7 wherein the processor is further configured to run the program to execute, after detecting the first touch operation to the touch key:

reporting the first touch operation if the second touch operation to the touch area is not detected within the preset time period, when the first touch operation is detected.

10. The terminal of claim 7, wherein obtaining the current direction state of the touch screen comprises:

obtaining the current direction state of the touch screen state through an Android standard interface when an operating system of the terminal is an Android system.

11. The terminal of claim 7, wherein the preset application list comprises system default applications.

12. The terminal of claim 7, wherein the preset application list comprises applications that run with the current direction state of the touch screen being the first direction state, and with touch operations to the touch area or the touch key.

13. A non-transitory computer-readable storage medium storing executable program codes which, when executed by one or more computer processors, cause the one or more computer processors to run a program corresponding to the executable program codes by reading the executable program codes stored in the memory to execute a method for preventing unintentional triggering of a touch key, the method comprising:

obtaining a current direction state of the touch screen;

obtaining an application currently displayed when the current direction state of the touch screen is a first direction state;

determining whether the application currently displayed is an application in a preset application list by comparing a name of the application currently displayed with the application names in the preset application list;

detecting a first touch operation to the touch key when the application currently displayed is in the preset application list; and determining that the first touch operation is an unintentional operation if a second touch operation to the touch area is detected within a preset time period when the first touch operation is detected.

14. The non-transitory computer-readable storage medium of claim 13, wherein determining that the first touch operation is the unintentional operation if the second touch operation to the touch area is detected within the preset time period when the first touch operation is detected comprises:

enabling a timer with a timing length being the preset time period when the first touch operation is detected; and determining that the first touch operation is the unintentional operation if the second touch operation to the touch area is detected within the timing length of the timer.

15. The non-transitory computer-readable storage medium of claim 13, wherein the method further comprising, after detecting the first touch operation to the touch key:

reporting the first touch operation if the second touch operation to the touch area is not detected within the preset time period, when the first touch operation is detected.

16. The non-transitory computer-readable storage medium of claim 13, wherein obtaining the current direction state of the touch screen comprises:

obtaining the current direction state of the touch screen state through an Android standard interface when an operating system of the terminal is an Android system.

17. The non-transitory computer-readable storage medium of claim 13, wherein the preset application list comprises one of a group including:

system default applications; and applications that run with the current direction state of the touch screen being the first direction state, and with touch operations to the touch area or the touch key.

* * * * *